(12) United States Patent
Ryu et al.

(10) Patent No.: US 12,108,395 B2
(45) Date of Patent: Oct. 1, 2024

(54) BEAM FORMED PARTIAL SENSING

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Arumugam Chendamarai Kannan, San Diego, CA (US); Jelena Damnjanovic, Del Mar, CA (US); Wooseok Nam, San Diego, CA (US); Juan Montojo, San Diego, CA (US); Piyush Gupta, Bridgewater, NJ (US); Kapil Gulati, Belle Mead, NJ (US); Jing Sun, San Diego, CA (US); Xiaoxia Zhang, San Diego, CA (US); Yan Zhou, San Diego, CA (US); Peter Gaal, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/211,024

(22) Filed: Mar. 24, 2021

(65) Prior Publication Data

US 2022/0312397 A1    Sep. 29, 2022

(51) Int. Cl.
*H04W 72/20* (2023.01)
*H04W 72/044* (2023.01)
*H04W 74/0808* (2024.01)

(52) U.S. Cl.
CPC ......... *H04W 72/20* (2023.01); *H04W 72/046* (2013.01); *H04W 74/0808* (2013.01)

(58) Field of Classification Search
CPC .......... H04W 72/0406; H04W 72/046; H04W 74/0808; H04W 72/20
See application file for complete search history.

(56) References Cited

U.S. PATENT DOCUMENTS

| | | | |
|---|---|---|---|
| 2013/0059619 A1* | 3/2013 | Kim ..................... | H04B 7/0617 455/509 |
| 2018/0279094 A1* | 9/2018 | Blasco Serrano .... | H04W 72/04 |
| 2020/0029245 A1 | 1/2020 | Khoryaev et al. | |
| 2020/0036422 A1* | 1/2020 | Li ......................... | H04B 7/0695 |
| 2020/0229006 A1* | 7/2020 | Chen ................... | H04B 7/0695 |
| 2021/0051653 A1* | 2/2021 | Park .................. | H04W 72/0413 |
| 2021/0100059 A1* | 4/2021 | Xu ....................... | H04L 5/0048 |

(Continued)

OTHER PUBLICATIONS

International Search Report and Written Opinion—PCT/US2022/013736—ISA/EPO—May 6, 2022.

(Continued)

*Primary Examiner* — Jasper Kwoh
(74) *Attorney, Agent, or Firm* — Patterson & Sheridan LLP

(57) ABSTRACT

Aspects of the present disclosure provide apparatus, methods, processing systems, and computer readable mediums for beam formed partial sensing by a user equipment (UE). An example method generally includes performing partial sensing by monitoring for sidelink transmissions from one or more other UEs using one or more different beams during one or more different portions of a sensing window; and selecting resources, within a resource selection window, for future sidelink communications based on results of the partial sensing.

28 Claims, 13 Drawing Sheets

(56) References Cited

U.S. PATENT DOCUMENTS

| | | | |
|---|---|---|---|
| 2021/0105104 A1* | 4/2021 | Cao | H04L 1/1861 |
| 2021/0127365 A1* | 4/2021 | Wang | H04W 72/085 |
| 2021/0392707 A1* | 12/2021 | Do | H04W 76/14 |
| 2022/0015070 A1* | 1/2022 | Chen | H04W 72/14 |
| 2023/0020105 A1* | 1/2023 | Shin | H04W 72/543 |
| 2023/0180270 A1* | 6/2023 | Liu | H04W 72/542 370/329 |

OTHER PUBLICATIONS

Qualcomm Incorporated: "Power Savings for Sidelink", 3GPP TSG RAN WG1 Meeting #104-e, 3GPP Draft, R1-2101485, 3rd Generation Partnership Project (3GPP), Mobile Competence Centre, 650, Route Des Lucioles, F-06921, Sophia-Antipolis Cedex, France, vol. RAN WG1, No. Jan. 25, 2021-Feb. 5, 2021, Jan. 19, 2021 (Jan. 19, 2021), XP051971650, 11 Pages, Retrieved from the Internet: URL: https://ftp.3gpp.org/tsg_ran/WG1_RL1/TSGR1_104-e/Docs/R1-2101485.zip R1-2101485_power_saving.docx [retrieved on Jan. 19, 2021] the whole document.

Samsung: "On Resource Allocation for Power Saving", 3GPP TSG RAN WG1 Meeting #104-e, 3GPP Draft, R1-2101231, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051971444, pp. 1-7, Retrieved from the Internet: URL: https://ftp.3gpp.org/tsg_ran/WG1_RL1/TSGR1_104-e/Docs/R1-2101231.zip R1-2101231_PowerSaving.docx [retrieved on Jan. 19, 2021] the whole document.

Vivo: "Resource Allocation for Sidelink Power Saving", 3GPP TSG RAN WG1 #104-e, 3GPP Draft, R1-2101790, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 25, 2021 (Jan. 25, 2021), XP051975892, 17 Pages, Retrieved from Internet: URL: https://ftp.3gpp.org/tsg_ran/WG1_RL1/TSGR1_104-e/Docs/R1-2101790.zip R1-2101790 Resource allocation for sidelink powersaving.docx [retrieved on Jan. 25, 2021] pp. 1-13.

* cited by examiner

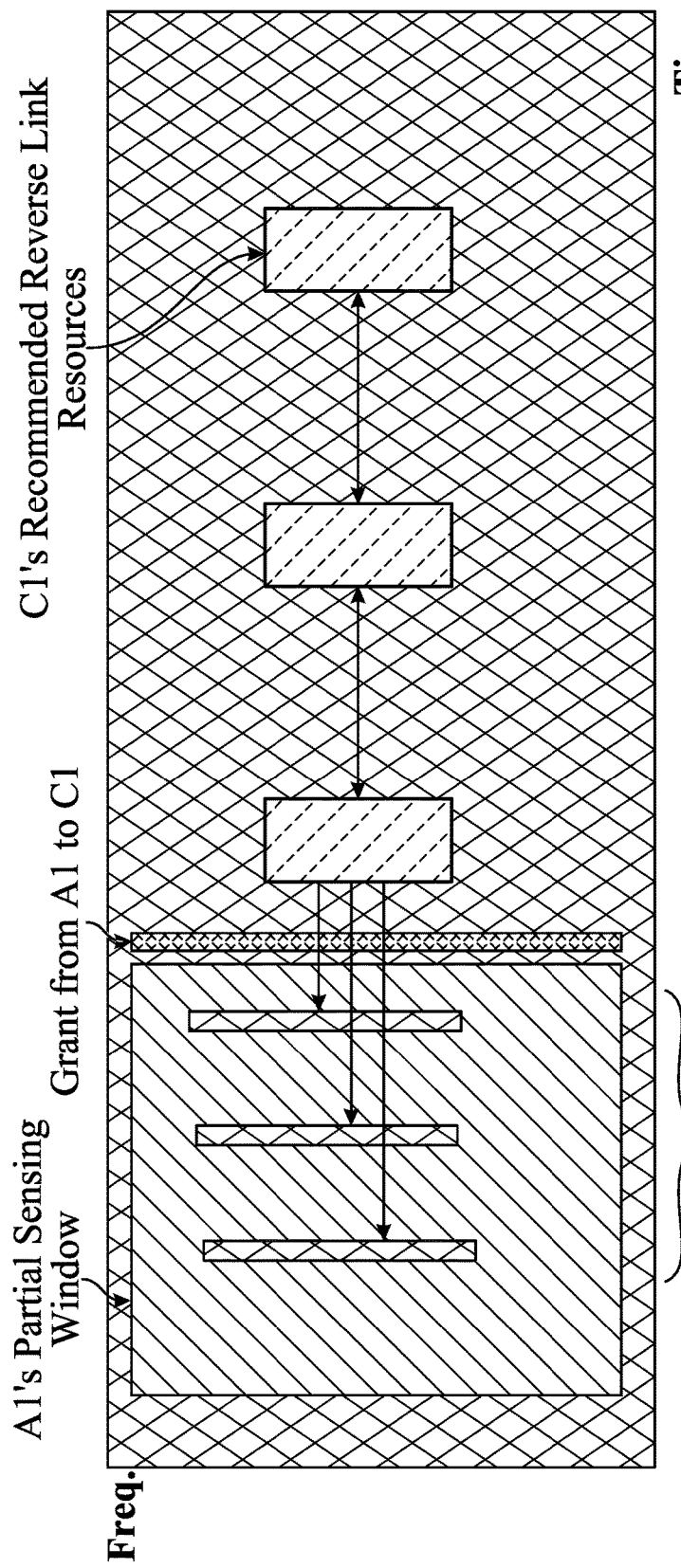
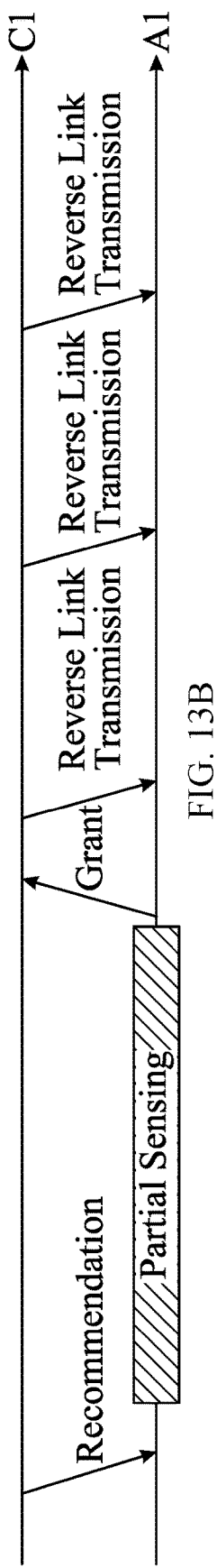
FIG. 13A
FIG. 13B

BEAM FORMED PARTIAL SENSING

INTRODUCTION

Aspects of the present disclosure relate to wireless communications, and more particularly, to sidelink communication between wireless devices.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved sidelink communication techniques.

Certain aspects of the present disclosure are directed to a method for wireless communication by a user equipment (UE). The method generally includes performing partial sensing by monitoring for sidelink transmissions from one or more other UEs using one or more different beams during one or more different portions of a sensing window; and selecting resources, within a resource selection window, for future sidelink communications based on results of the partial sensing.

Certain aspects of the present disclosure are directed to an apparatus for wireless communication by a UE. The apparatus generally includes a memory, and one or more processors coupled to the memory, the one or more processors and the memory being configured to perform partial sensing by monitoring for sidelink transmissions from one or more other UEs using one or more different beams during one or more different portions of a sensing window; and select resources, within a resource selection window, for future sidelink communications based on results of the partial sensing.

Certain aspects of the present disclosure are directed to an apparatus for wireless communication by a UE. The apparatus generally includes means for performing partial sensing by monitoring for sidelink transmissions from one or more other UEs using one or more different beams during one or more different portions of a sensing window; and means for selecting resources, within a resource selection window, for future sidelink communications based on results of the partial sensing.

Certain aspects of the present disclosure are directed to a computer readable medium having instructions stored thereon for performing partial sensing by monitoring for sidelink transmissions from one or more other UEs using one or more different beams during one or more different portions of a sensing window; and selecting resources, within a resource selection window, for future sidelink communications based on results of the partial sensing.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 13A and 13B are example timelines illustrating example signaling and timing for partial sensing by the anchor device and client device of FIG. 12, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
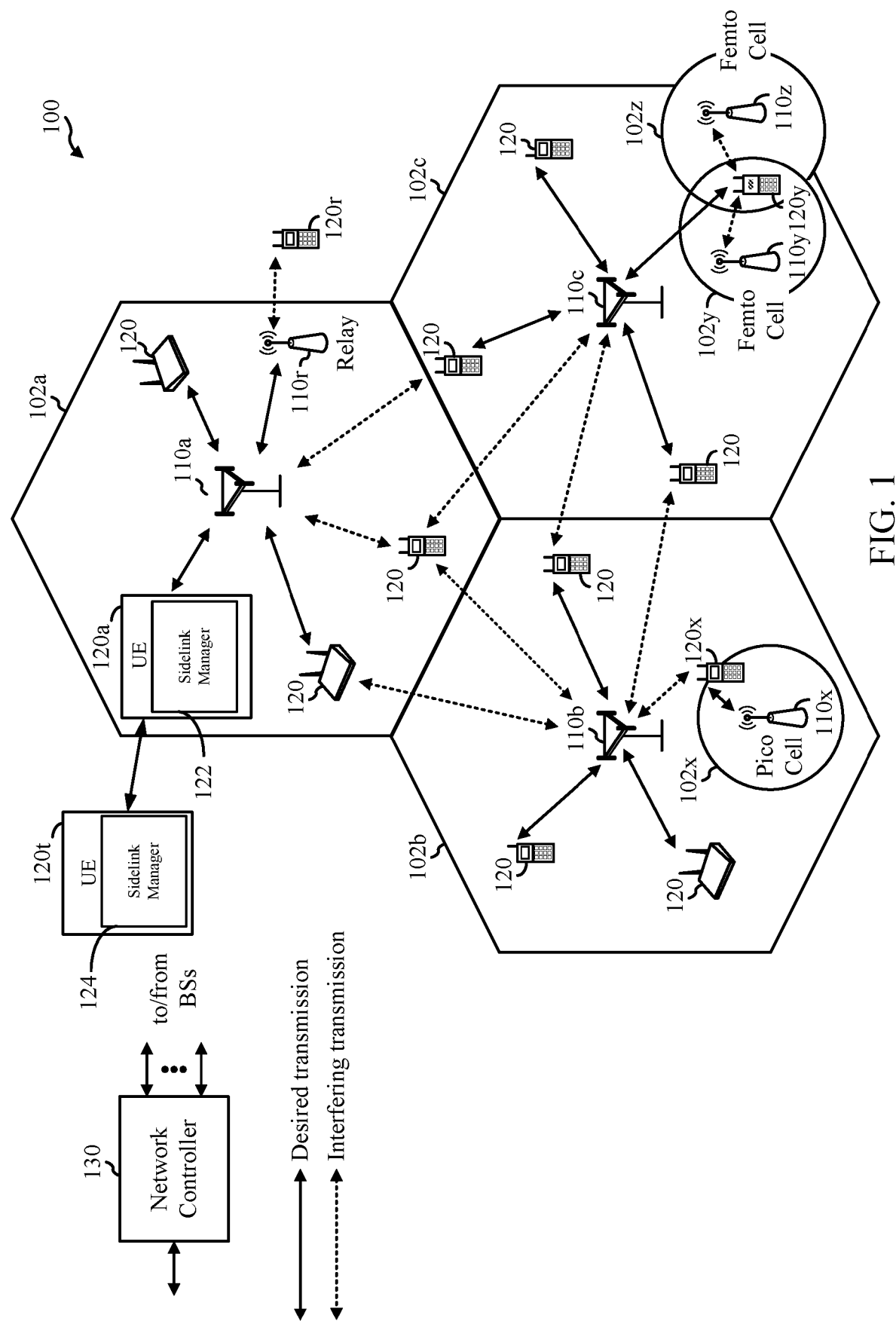
FIG. 1 is a block diagram conceptually illustrating an example telecommunications system, in accordance with certain aspects of the present disclosure.

Aspects of the present disclosure provide apparatus, methods, processing systems, and computer readable mediums for sidelink communication between wireless devices. In particular, certain aspects provide for sensing techniques, referred to as partial sensing, such that a user equipment (UE) can more efficiently and smartly detect sidelink transmissions during a sensing window.

Partial sensing generally refers to performing sensing (e.g., by decoding sidelink transmissions) during only a portion (or portions) of a sensing window, which may help conserve power at the sensing UE. As proposed herein, partial sensing may be performed using multiple beams, where different beams are used for sensing during different portions of the sensing window.

Conventionally, full sensing may be used by a transmitting (Tx) sidelink UE for resource selection. In full sensing, the UE performs sensing during the entire sensing window, where the UE monitors for sidelink control indicators (SCIs) in the full duration of the sensing window. In partial sensing, the UE monitors for SCIs for only part of the sensing window. In previous solutions, it has been proposed that a beam be specified for sensing (e.g., the beam that the UE will use to transmit/receive during resource selection window). Partial sensing, as opposed to full sensing, is sensing based on a reduced amount of resources for power saving. Thus, instead of searching for and attempting to decode SCIs and/or other control signals in the entirety of a sensing window, a UE could search/decode in only parts of the sensing window, can help save on power consumption.

The following description provides examples of configurations for SL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may include one or more UEs 120 configured to perform partial sensing on sidelink transmissions from other UEs using different beams during different portions of a sensing window, in accordance with operations 800 of FIG. 8.

As shown in FIG. 1, the UE 120a includes a Sidelink manager 122. The sidelink manager 122 may be configured to perform one or more operations described in more detail herein. Furthermore, the UE 120t includes a Sidelink manager 124. The sidelink manager 124 may be configured to perform one or more operations described in more detail herein.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
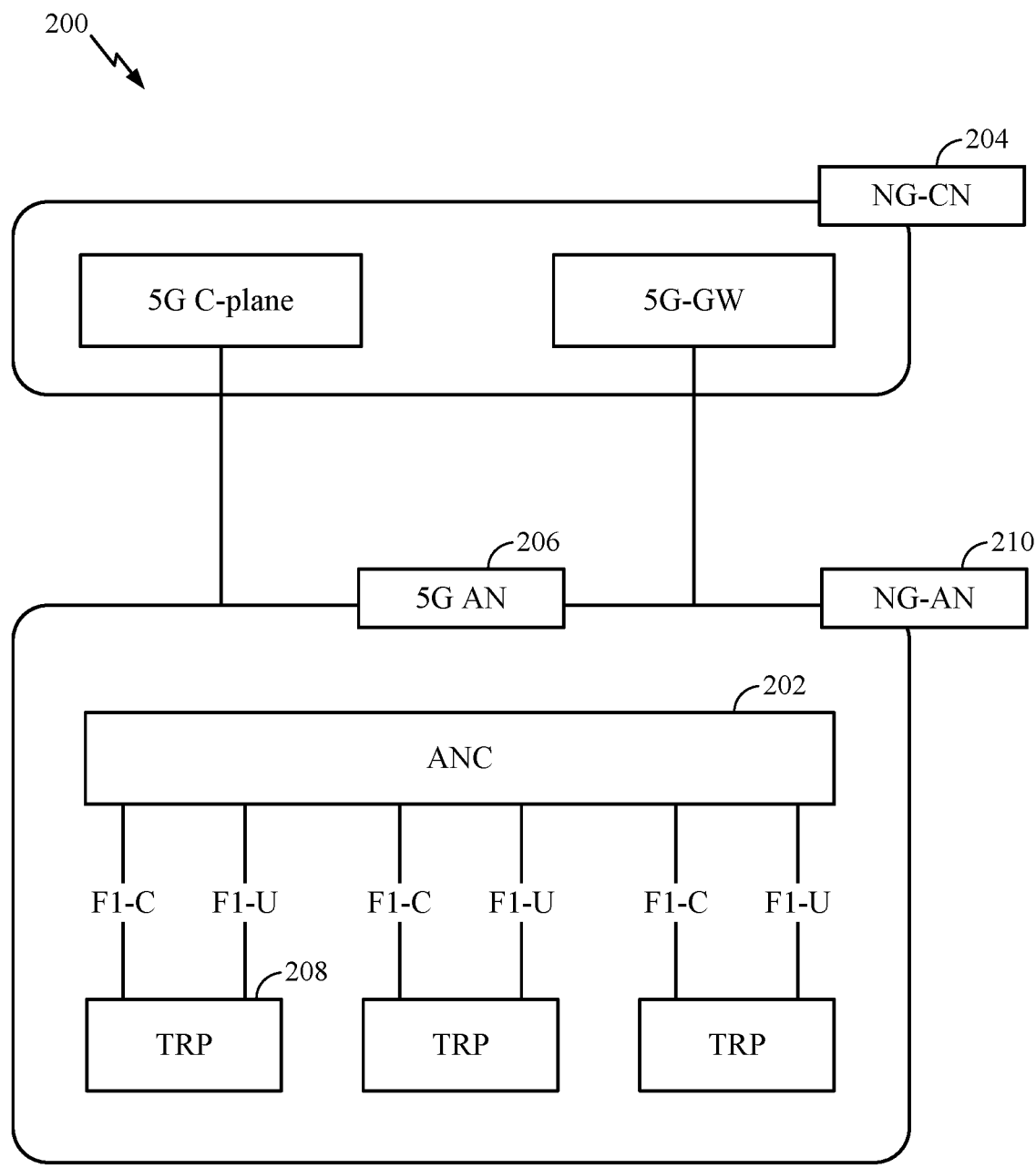
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
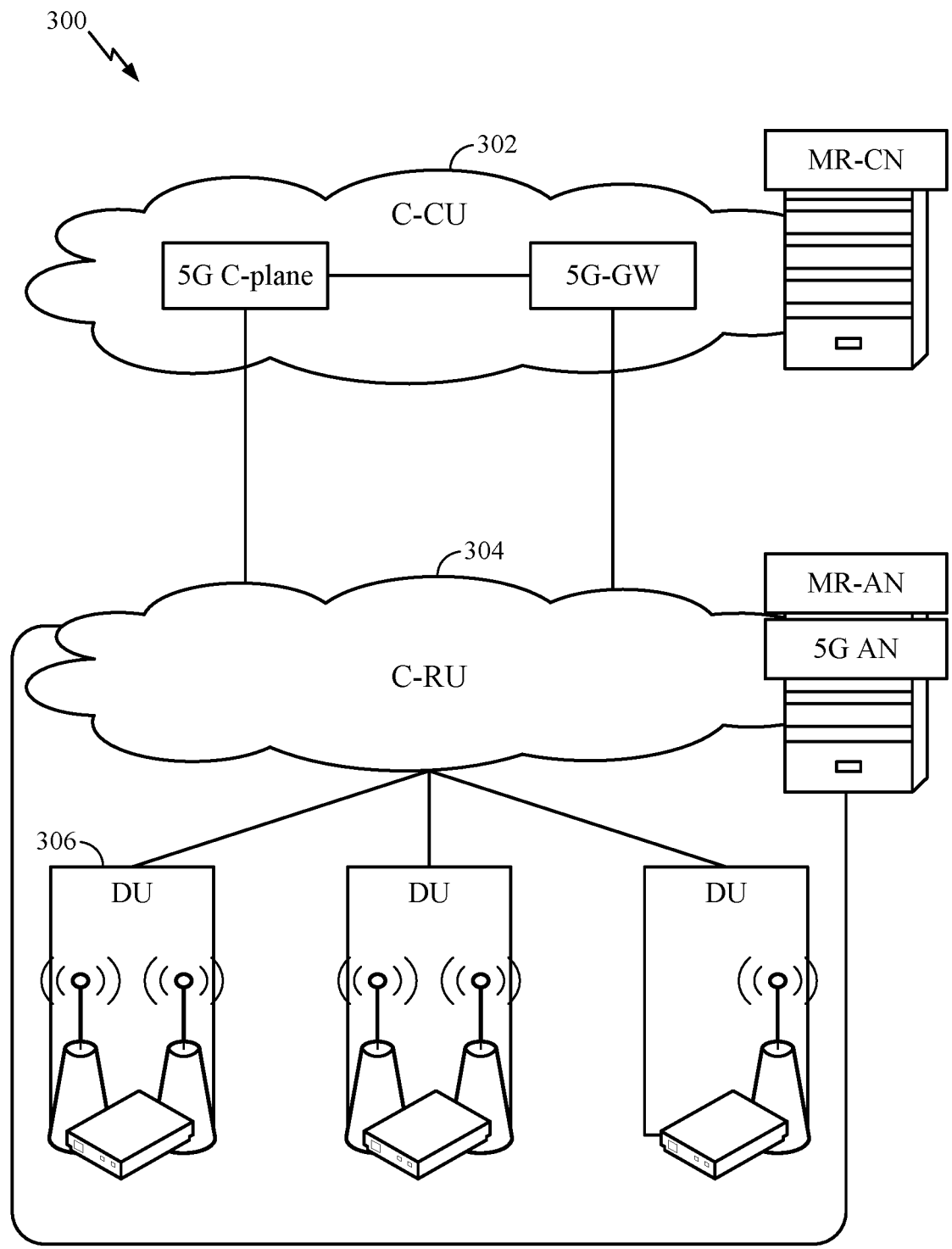
FIG. 3 is a diagram illustrating an example physical architecture of a distributed RAN, in accordance with certain aspects of the present disclosure.

FIG. 3 illustrates an example physical architecture of a distributed RAN 300, in accordance with certain aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
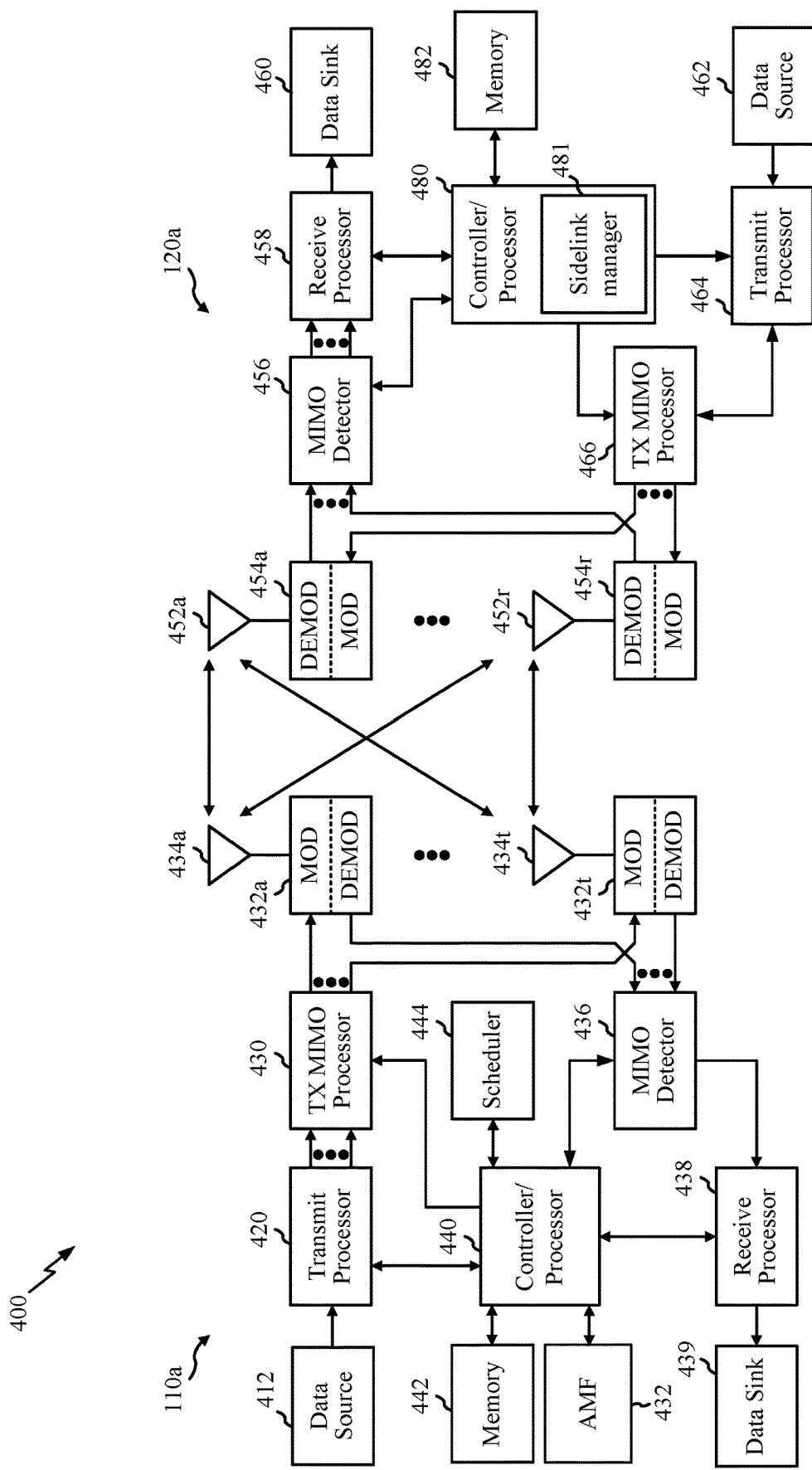
FIG. 4 is a block diagram conceptually illustrating a design of an example base station (BS) and user equipment (UE), in accordance with certain aspects of the present disclosure.

FIG. 4 illustrates example components of BS 110a and UE 120a and/or UE 120t (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein with reference to FIGS. 8-13.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 432a through 432t may be transmitted via the antennas 434a through 434t, respectively.

At the UE 120a, the antennas 452a through 452r may receive the downlink signals from the BS 110a and may provide received signals to the demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the UL, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110a. At the BS 110a, the UL signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 2, the controller/processor 480 of the UE 120a has a sidelink manager 481 that may be configured for transmitting a sidelink communication to another UE. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the DL, sidelink, and/or UL.

Example Sidelink Communications

While communication between user equipments (UEs) (e.g., UE 120a and/or UE 120t of FIGS. 1 and 4) and base stations (BSs) (e.g., BSs 110 of FIGS. 1 and 4) may be referred to as the access link, and the access link may be provided via a cellular (Uu) interface, communication between devices may be referred to as the sidelink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5A:
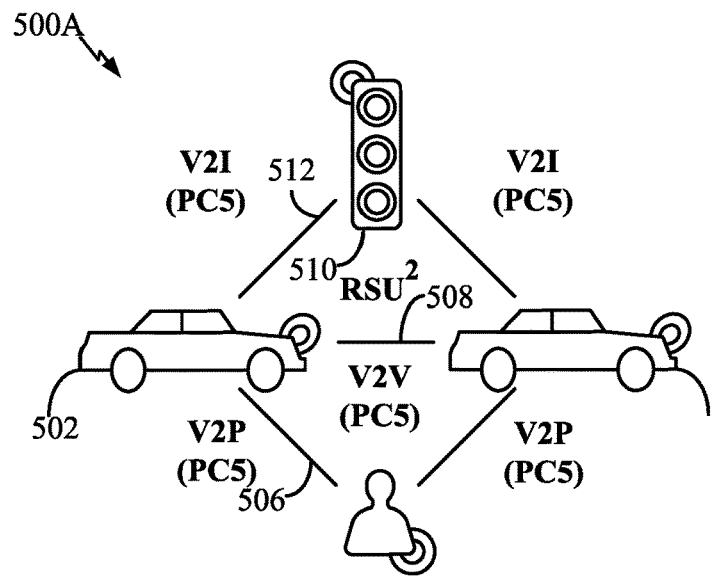
FIGS. 5A and 5B show diagrammatic representations of example vehicle to everything (V2X) systems, in accordance with certain aspects of the present disclosure.
Figure 5B:
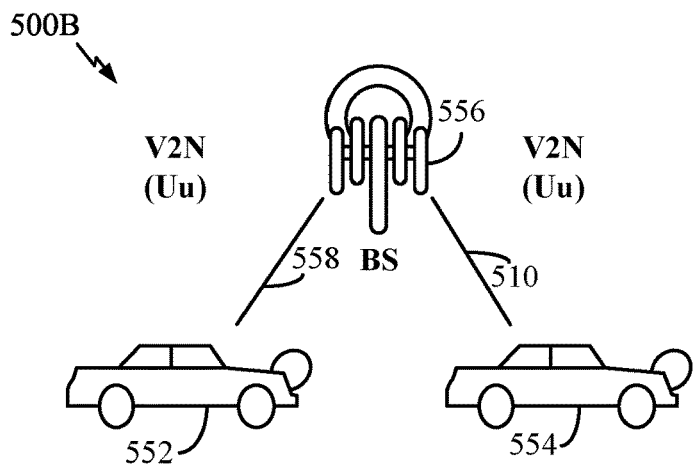

FIGS. 5A and 5B show diagrammatic representations of example vehicle to everything (V2X) systems, in accordance with certain aspects of the present disclosure. For example, the vehicles shown in FIGS. 5A and 5B may communicate via sidelink channels and may perform sidelink channel state information (CSI) reporting as described herein.

V2X systems, provided in FIGS. 5A and 5B provide two complementary transmission modes. A first transmission mode, shown by way of example in FIG. 5A, involves direct communications (for example, also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500A (for example, including vehicle-to-vehicle (V2V) communications) is illustrated with two vehicles 502, 504. The first transmission mode may allow for direct communication between different participants in a given geographic location. As illustrated, a vehicle may have a wireless communication link 506 with an individual (i.e., vehicle to pedestrian (V2P)) (for example, via a UE) through a PC5 interface. Communications between vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 500B for communication between a vehicle 552 and a vehicle 554 through a network entity 556. These network communications may occur through discrete nodes, such as a BS (for example, an eNB or gNB), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks (WLANs), which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry acknowledgement (ACK) and/or negative ACK (HACK) from one sidelink UE (e.g., a receiver sidelink UE) to another sidelink UE (e.g., a transmitter sidelink UE).

For sidelink communications, resources may be allocated differently in Mode 1 and in Mode 2. In Mode 1 sidelink communication, the sidelink resources are often scheduled by a gNB. In Mode 2 sidelink communication, the UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

Figure 9:
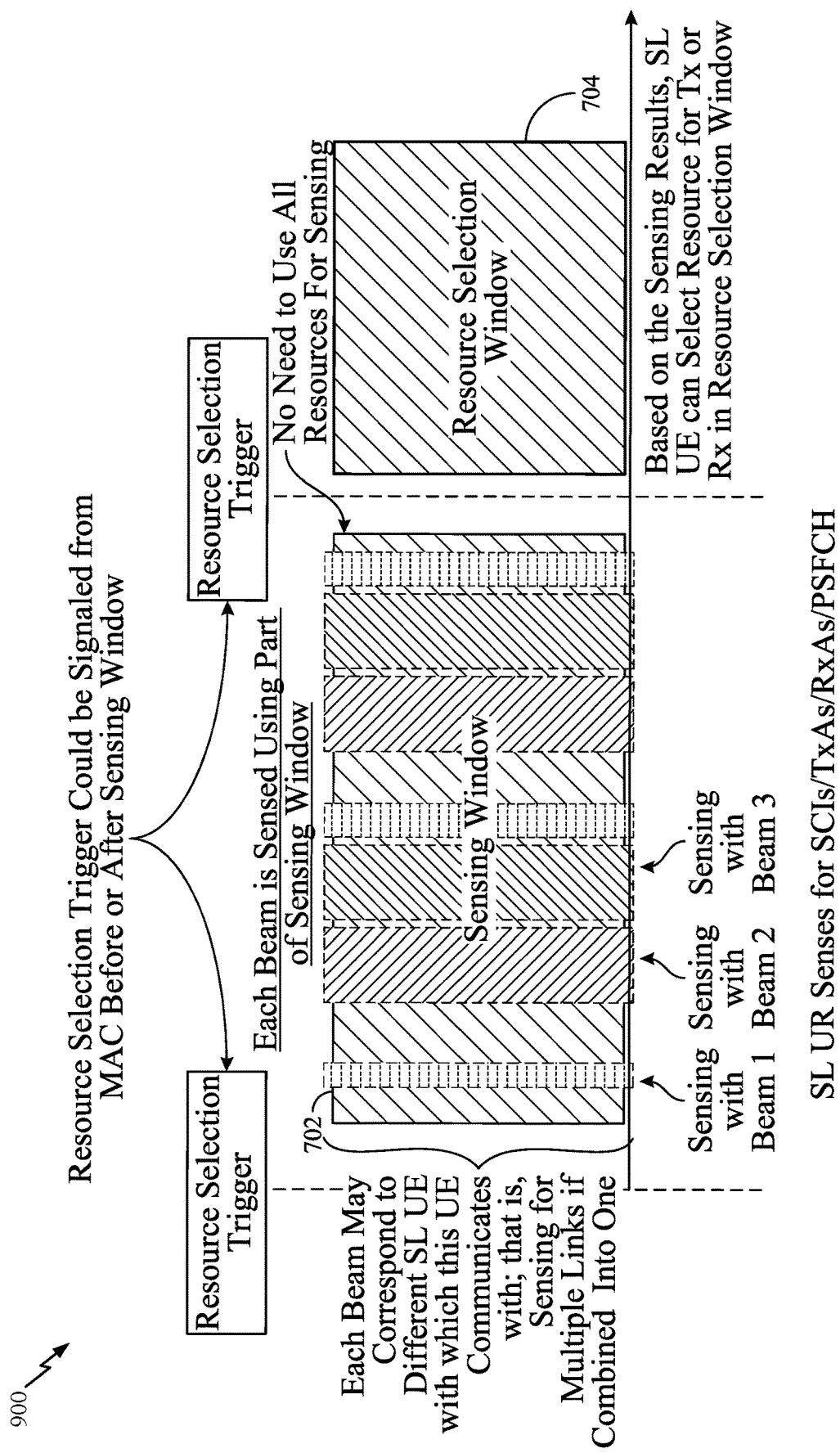
FIG. 9 is an example timeline illustrating partial sensing of multiple beams during a sensing window, in accordance with certain aspects of the present disclosure.

In Mode 2, when traffic arrives at a transmitting UE, the transmitting UE may select resources for PSCCH and PSSCH, and/or reserve resources for retransmissions to minimize latency. Therefore, in conventional configurations the transmitting UE would select resources for PSSCH associated with PSCCH for initial transmission and blind retransmissions, which incurs unnecessary resources and the related power consumption. To avoid such resource waste and other similar resource duplication/blind reservation/redundancy, the UEs in sidelink communication may communicate, as shown in FIG. 9, to use a subset of the resources.

Figure 6:
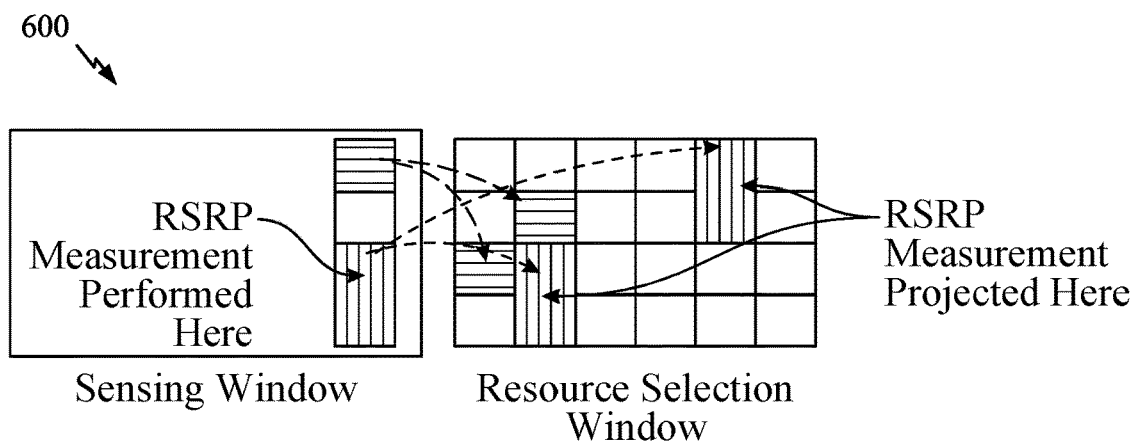
FIG. 6 illustrates an example sensing window and a resource selection window, in accordance with certain aspects of the present disclosure.

FIG. 6 illustrates an example sensing window and a resource selection window, in accordance with certain aspects of the present disclosure. A UE, in Mode 2 during candidate resource identification or sensing, may determine whether a resource is available or not by decoding SCIs. The sensing window generally refers to a duration in which the UE monitors for SCI transmissions from other UEs to identify resources reserved for future sidelink transmissions.

For example, the UE may first measure received power (e.g., reference signal received power, or RSRP) for SCI transmissions within a sensing window. The RSRP may be measured on PSCCH or PSSCH according to configuration or pre-configuration. The length of the sensing window (where SCI is decoded) may be configured or pre-configured. In Mode 2, a sidelink TX UE may perform sensing for a time period of 100 ms to 1000 ms in order to avoid collision.

In the sensing window, the TX UE may decode the SCI to determine if a resource is available in the resource selection window (e.g., as shown in FIG. 6). If an SCI is detected (e.g., RSRP above a threshold value), the UE may decode the SCI to determine the reservation of resources within a resource selection window. In general, the TX UE may exclude resources that are identified as reserved based on decoded SCIs within the sensing window.

Example Beam Formed Partial Sensing

Certain aspects of the present disclosure provide techniques for sidelink communication between wireless devices. In particular, certain aspects provide for partial sensing by a transmitter UE using multiple beams to efficiently monitor for sidelink transmissions from other UEs.

Conventionally, sensing may be used by a transmitting (Tx) sidelink UE for resource selection. When a sidelink UE in mode 2 (e.g., described above) intends to make a sidelink transmission, the UE needs to figure out which resources are available that can be used. Further, it is desirable that the UE avoids using resources that are already being used by other UEs. In this regard, the UE may determine which resources are available by receiving sidelink control indicators (SCIs) from other UEs. A SCI contains information that indicate what resources are being used, and, in some cases, may contain priority of the indicated transmission and a resource reservation interval. The UE monitors (and receives) SCIs from the other UEs during a sensing window. Then, based on SCIs received during the sensing window, the UE can determine what resources are available and/or used in a subsequent resource selection window.

Figure 7:
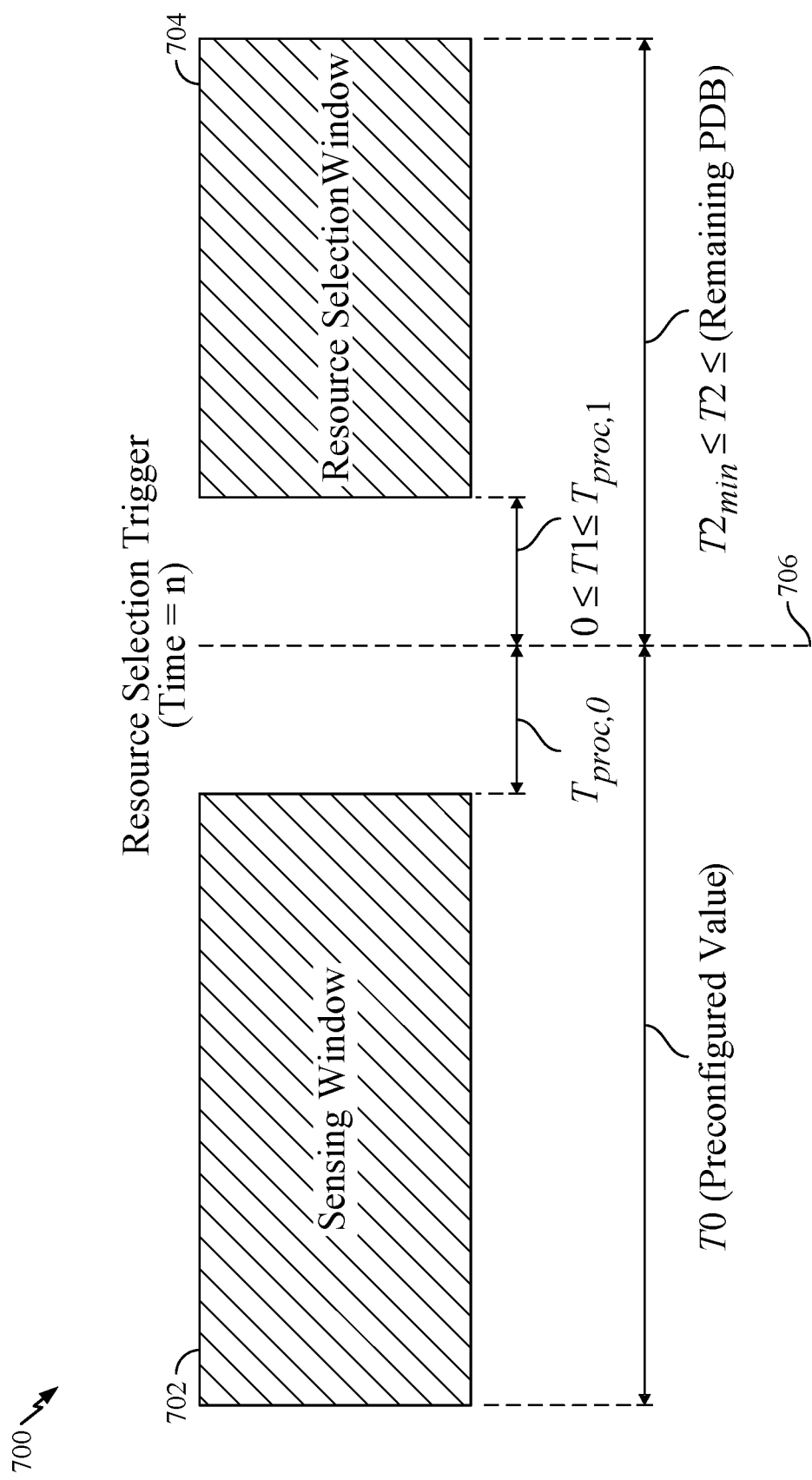
FIG. 7 illustrates an example sensing window and a resource selection window with associated timing configurations, in accordance with certain aspects of the present disclosure.

This technique is further exemplified by FIG. 7, which illustrates an example sensing window 702 and a resource selection window 704 with associated timing configurations, in accordance with certain aspects of the present disclosure. As shown, the UE monitors during the sensing window 702 for a period of time, receives a resource selection trigger at 706, and performs resource selection during the resource selection window. As shown, the timing for the sensing window 702 and the resource selection window 704 may be based on associated timers.

In full sensing, the UE typically performs sensing during the entire sensing window 702, where the UE monitors for SCIs in the full duration of the sensing window 702. In partial sensing, the UE monitors for SCIs for only part of the sensing window 702. Typically, a single beam is specified for sensing (e.g., the beam that the UE will use to transmit/receive during the resource selection window 704).

However, for directional transmissions in certain frequency ranges, such as frequency range (FR) 2 (e.g., mmWave), utilizing a single beam for sensing by a transmitter UE may present some challenges. Additionally, having only the Tx UE doing the sensing and resource selection, and not involving the Rx UE(s), may not be the best method for sidelink communications on FR2.

As noted above, partial sensing, as opposed to full sensing, involves sensing based on a reduced amount of resources for power saving. To perform sensing in general, a UE monitors for decodes SCIs, transmission reservation announcements (TxAs), reception reservation announcements (RxAs), and/or a physical sidelink feedback channel (PSFCH), which consumes significant power. Thus, instead of searching for and attempting to decode SCIs (and/or other control signals) in the entirety of a sensing window, a UE could search/decode in only parts of the sensing window, which can help save on power consumption.

Certain aspects of the present disclosure provide techniques for partial sensing techniques within a beam formed network such that a UE can more efficiently and smartly utilize a sensing window. For example, a UE may perform partial sensing with multiple beams, using different beams during different portions of a sensing window, as will be described in greater detail with reference to FIG. 9.

Figure 8:
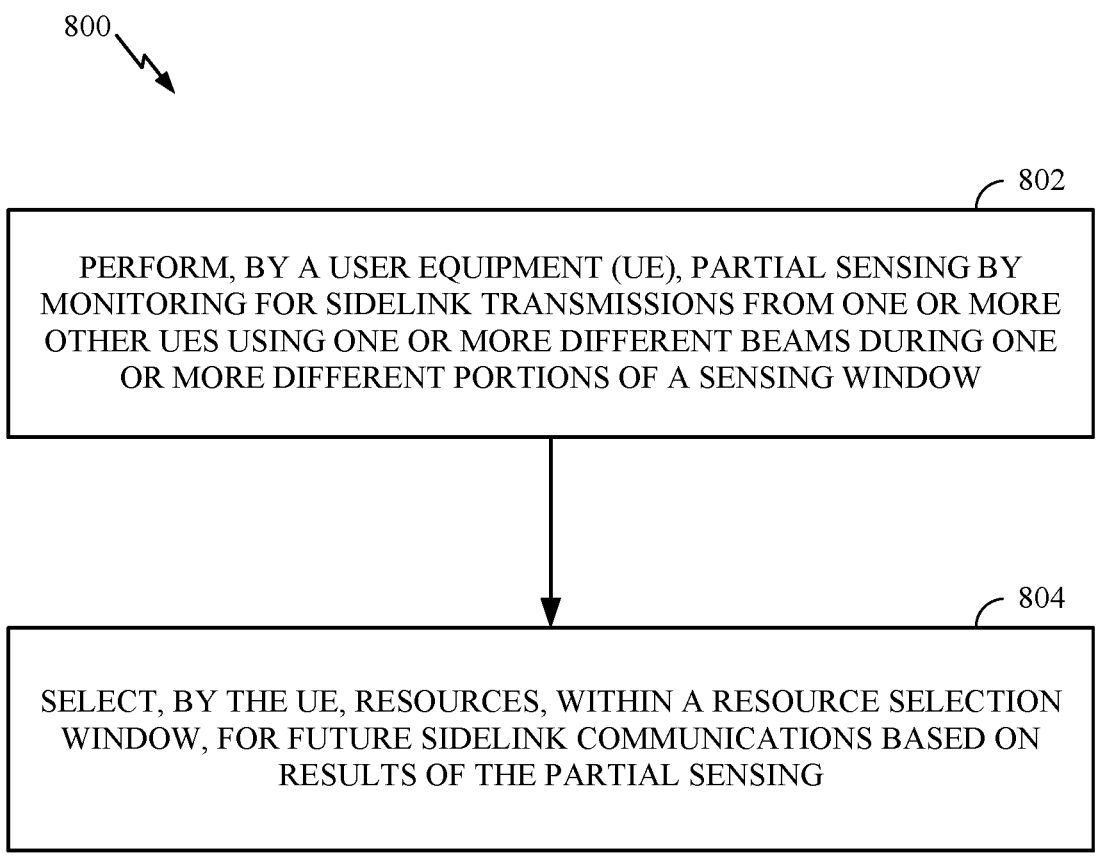
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a and/or the UE 120t in the wireless communication network 100 in FIG. 1). Operations 800 may be implemented as software components that are executed and run on one or more processors (e.g., controller/processor 280 and the Sidelink manager 281 of FIG. 2). Further, the transmission and reception of signals by the UE in operations 800 may be enabled, for example, by one or more antennas (e.g., antennas 272 of FIG. 2). In certain aspects, the transmission and/or reception of signals by the UE may be implemented via a bus interface of one or more processors (e.g., controller/processor 280) obtaining and/or outputting signals.

Operations 800 begin, at 802, by performing partial sensing by monitoring for sidelink transmissions from one or more other UEs using one or more different beams during one or more different portions of a sensing window. In some cases, the one or more different beams correspond to one or more different UEs with which the UE communicates via a sidelink. Furthermore, in certain aspects, the UE may select the resources based on a sensed indication of resources reserved for future sidelink communications.

At 804, the UE selects resources, within a resource selection window, for future sidelink communications based on results of the partial sensing.

The operations 800 described above and related techniques described herein may be understood with reference to the illustrations in FIGS. 9-13.

FIG. 9 is an example timeline 900 illustrating partial sensing of multiple beams during a sensing window 702, in accordance with certain aspects of the present disclosure. As shown, a resource selection trigger may be signaled (e.g., from a medium access control (MAC) layer of the sensing UE) before or after the sensing window 702. If the trigger is after, the sensing UE processes signals buffered during different portions of the sensing window using different beams as shown.

Furthermore, as illustrated, multiple beams are used for the sensing during different portions of the sensing window 702. For example, each of beam 1, beam 2, and beam 3 are sensed for different durations at different times during the sensing window 702. In some cases, although not shown each of beam 1, beam 2, and beam 3 may be sensed for the same duration during the sensing window 702. In certain aspects, each beam (e.g., beam 1, beam 2, beam 3) may correspond to a different sidelink UE with which this UE communicates. Thus, sensing for multiple links may be efficiently performed when such sensing is combined into one sensing window.

In certain aspects, a transmitting sidelink UE (with data to transmit) may sense for sidelink transmissions such as SCIs, TxAs, RxAs, and/or PSFCH. In particular, a TxA may be transmitted by a Tx sidelink UE to reserve future resources for transmission, and a RxA may be transmitted by a Rx sidelink UE to reserve future resource for reception. Based on the (partial) sensing results, the sidelink UE can select resource for transmission/reception in the resource selection window 704. Although only three beams are shown as being sensed in FIG. 9, it should be understood that the techniques described herein can apply to fewer or more than three beams and three UEs.

In certain aspects, when the sidelink UE changes to a new beam or makes a new connection to another sidelink UE, the sidelink UE may perform an initial full sensing. On the other hand, if the beams stay the same, then the sidelink UE may perform partial sensing.

In some cases, the duration of the partial sensing with any particular beam may be determined by beam width. That is, the duration of sensing with a particular beam may be determined based on a corresponding beam width for that beam. For example, if beam 1 of FIG. 9 is wider than beam 2, partial sensing with beam 1 may be of a shorter (or longer) duration than partial sensing with beam 2.

In certain aspects, instead of performing full sensing for each of multiple beams, the sidelink UE may perform full (or partial) sensing with a broad beam. This is possible as long as the combined coverage of the multiple beams is no larger than that of the broad beam.

In some cases, the decision to perform full or partial sensing can be a function of Tx channel busy ratio (CBR), Rx CBR, Tx channel occupancy ratio (CR), and/or Rx CR. For example, if CBR is low (or high), then the sidelink UE may perform partial sensing; and if CR is high, then the sidelink UE may perform full sensing.

As will be described in further detail below, sidelink UE may perform partial sensing in accordance with signaling with one (or more) other UE(s). In particular, a sidelink UE may receive a recommendation for specific resources (e.g., one or more sets of recommended resources) to perform the partial sensing. The other sidelink UE that provides the recommendation may perform full/partial sensing and generate one or more sets of recommended resources for communication. The sidelink UE may then perform partial sensing on the recommended resources, and both sidelink UEs can then communicate using one set resources.

In some cases, a TX SL UE an RX SL UE may both perform some type of sensing and coordinate using their results.

Figure 10:
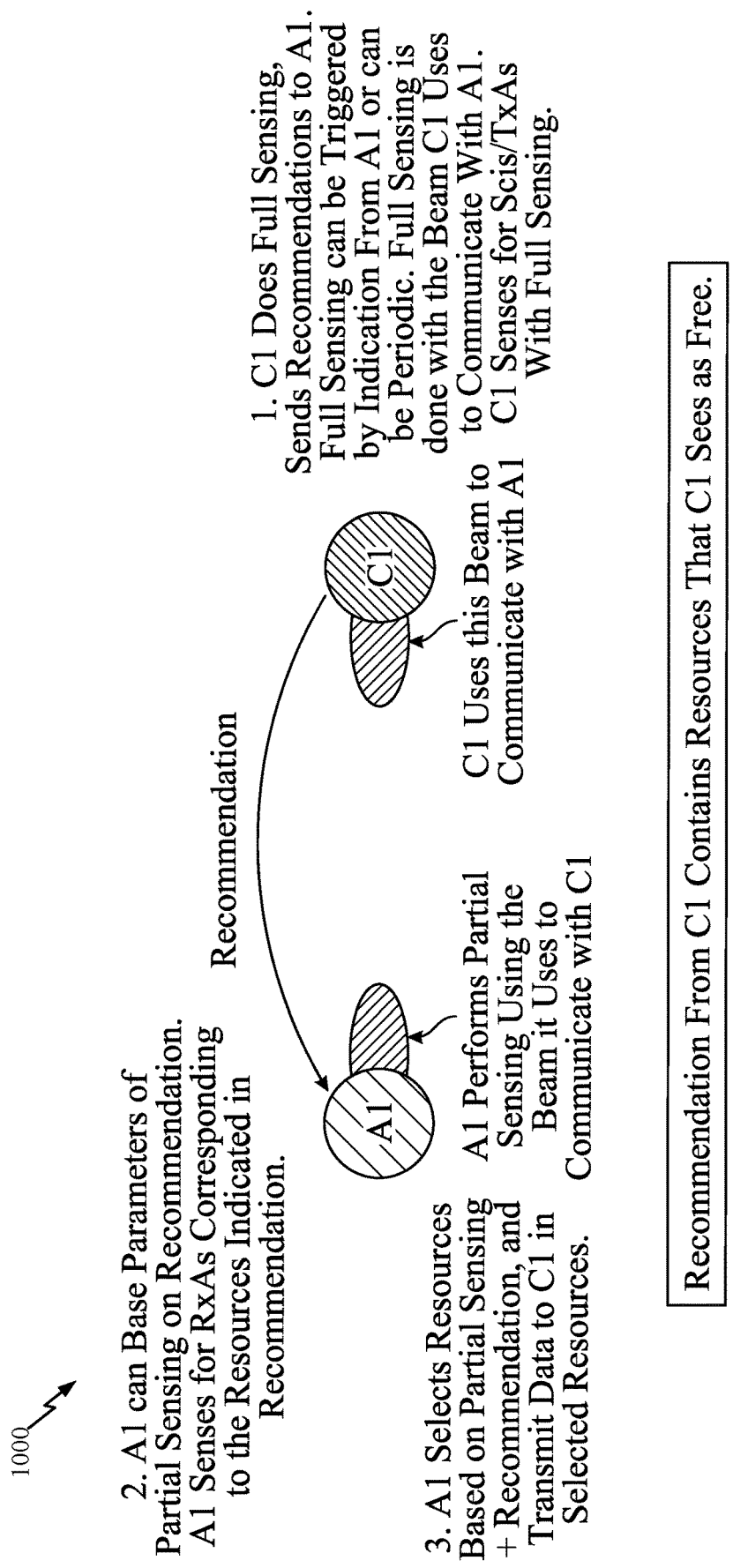
FIGS. 10 and 12 are diagrammatic representations of example signaling between an anchor device and a client device, in accordance with certain aspects of the present disclosure.

For example, FIG. 10 is a diagrammatic representation of example signaling 1000 between an anchor device (A1) and a client device (C1), in accordance with certain aspects of the present disclosure. In an industrial internet of things (IoT) setting, for example, anchor devices may include programmable logical controllers (PLCs), and client devices may include sensor/actuators (S/A). In certain aspects, A1 and/or C1 may correspond to the UE performing the operations 800 of FIG. 8.

As shown (labeled as step 1), C1 performs full sensing, and sends a recommendation to A1. In some cases, full sensing can be triggered by an indication from A1, or it can be periodic. As shown, the full sensing performed by C1 is done with the beam C1 uses to communicate with A1. Further, C1 may sense for SCIs and/or TxAs with full sensing. Furthermore, the recommendation that C1 sends may indicate resources that C1 sees as free (and thus usable).

After receiving the resource recommendation, A1 can base parameters for partial sensing on recommendation (labeled step 2). That is, A1 may sense for RxAs (or any control signal) corresponding to the resources indicated in the recommendation on the beam A1 uses to receive from C1. Further, as shown (labeled as step 3), A1 selects resources based on the partial sensing and the recommendation, and transmits data to C1 in the selected resources.

Figure 11A:
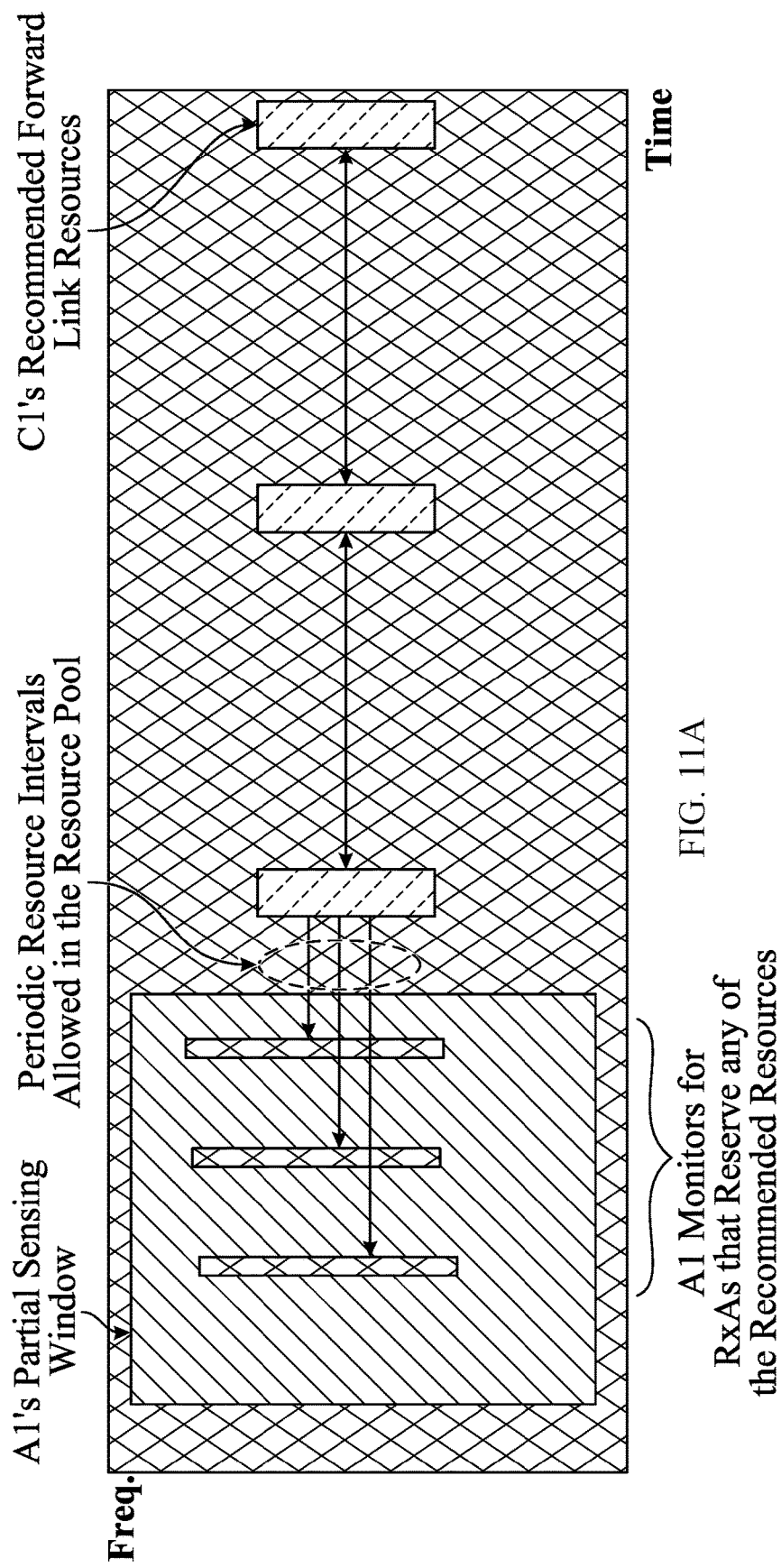
FIGS. 11A and 11B are example timelines illustrating example signaling and timing for partial sensing by the anchor device and client device of FIG. 10, in accordance with certain aspects of the present disclosure.
Figure 11B:
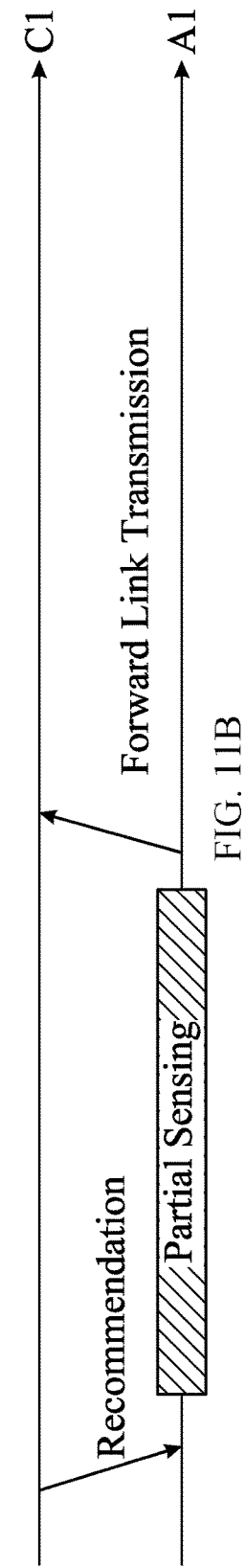

FIGS. 11A and 11B are example timelines illustrating example signaling and timing for partial sensing by A1 and C1 of FIG. 10, in accordance with certain aspects of the present disclosure. As shown in FIG. 11A, A1 monitors for reception reservation announcements (RxAs) that reserve any of the recommended resources during a partial sensing window. Based on the monitoring, A1 may then use resources for subsequent sidelink communications (e.g., C1's recommended forward link resources). As shown in FIG. 11B, C1 provides the recommendation to A1, A1 performs partial sensing (to select a set of communication resources), and A1 sends a forward link transmission to C1.

Figure 12:
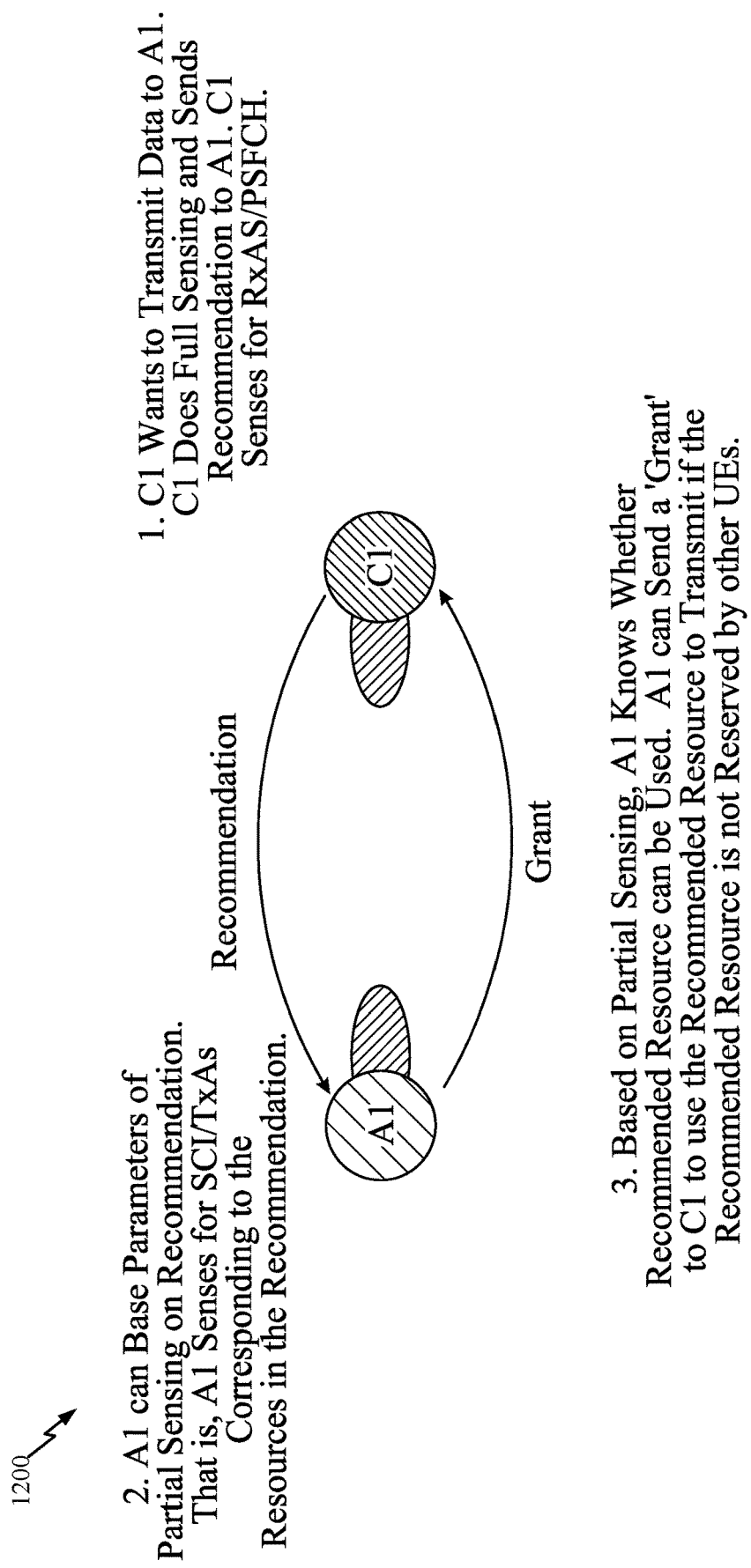

FIG. 12 is a diagrammatic representation of example signaling 1200 between A1 and C1, in accordance with certain aspects of the present disclosure. As shown (labeled step 1), C1 wants to transmit data to A1, so C1 performs full sensing (e.g., sense for RxAs and/or PSFCH) and sends a recommendation to A1 based on that sensing. Further, A1 may base parameters of partial sensing on the recommendation by sensing for SCI and/or TxAs corresponding to the resources in the recommendation (labeled step 2). Then, based on the partial sensing, A1 knows whether recommended resources can be used (labeled step 3). Accordingly, as shown, can send a grant message to C1 to use the recommended resource to transmit if the recommended resource is not reserved by other UEs. In this manner, the grant may in effect "down-select" from the sets of recommend resources initially provided by C1.

FIGS. 13A and 13B are example timelines illustrating example signaling and timing for partial sensing by the anchor device and client device of FIG. 12, in accordance with certain aspects of the present disclosure. As shown in FIG. 13A, A1 checks for TxAs and/or RxAs at periodic resource intervals to determine whether there are any SCIs that reserve any of the recommended resources. If there are SCIs that already reserve the recommended resource, then the recommended resource(s) cannot be used. Additionally, as shown, A1 sends a grant to C1 to indicate the recommended resources can be used for reverse link transmissions. Thus, as shown in FIG. 13B, C1 sends a recommendation, A1 performs partial sensing based on the recommended resource in the recommendation, A1 sends a grant to C1 if the resources can be used, and A1 receives reverse link transmissions from C1 based on selected resources.

Example Communications Devices

Figure 14:
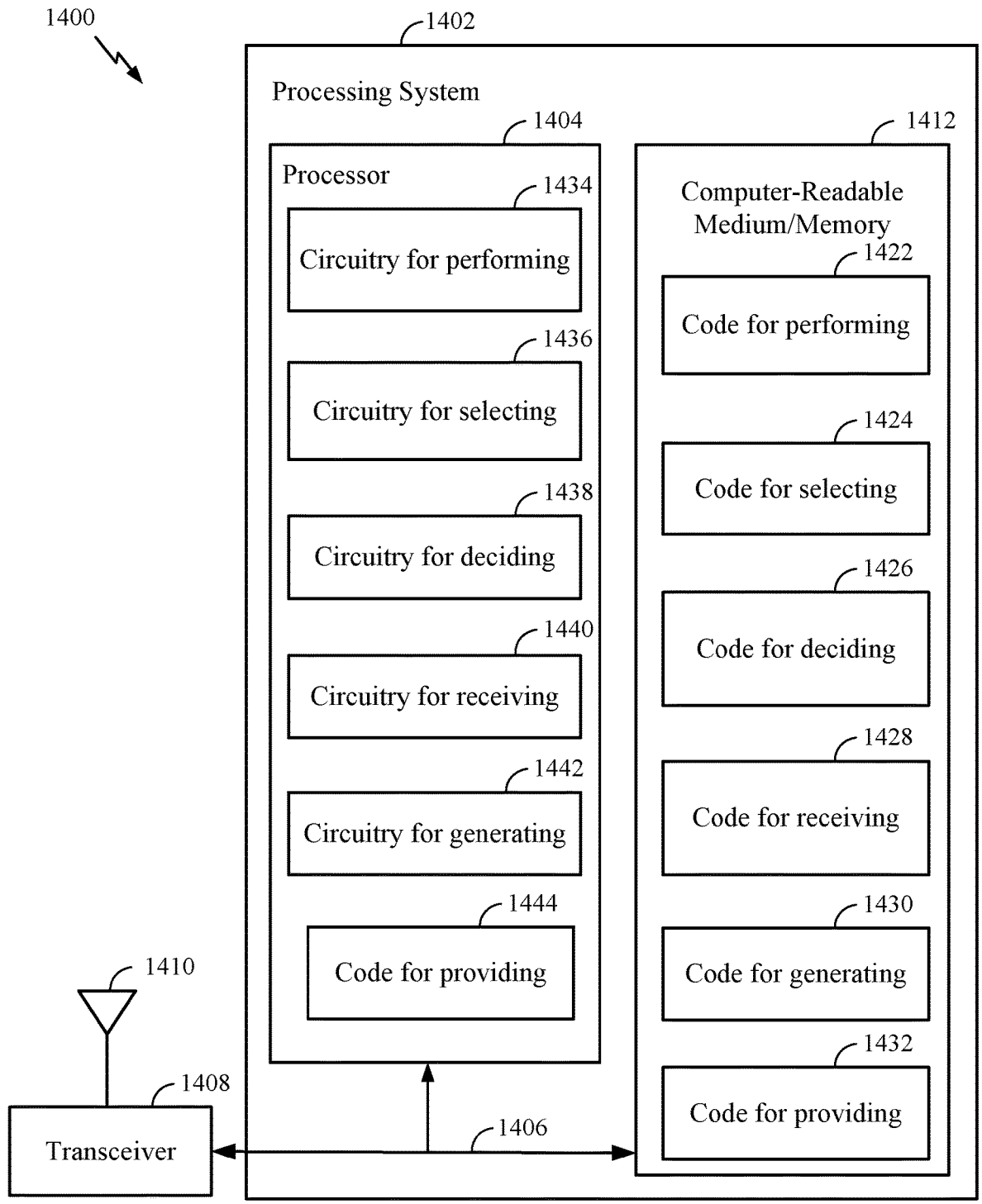
FIG. 14 illustrates an example communications devices that may include various components configured to perform operations for the techniques disclosed herein.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8. In certain aspects, computer-readable medium/memory 1412 stores code 1422 for performing; code 1424 for selecting; code 1426 for deciding; code 1428 for receiving; code 1430 for generating; and code 1432 for providing.

In certain aspects, the code 1422 for performing may include code for performing partial sensing by monitoring for sidelink transmissions from one or more other UEs using one or more different beams during one or more different portions of a sensing window; code for performing full sensing by monitoring for sidelink transmissions from one or more other UEs during a larger portion of the sensing window than used for the partial sensing, when the UE changes to a new beam for sidelink communications or makes a new connection to another UE; code for performing the partial sensing based on the one or more recommended sets of resources.

In certain aspects, the code 1424 for selecting may include code for selecting resources, within a resource selection window, for future sidelink communications based on results of the partial sensing and/or code for selecting, based on the partial sensing, one of the one or more recommended sets of resources to use for subsequent sidelink communication with the other UE.

In certain aspects, the code 1426 for deciding may include code for deciding whether to perform the partial sensing or full sensing by monitoring a larger portion of the sensing window than used for the partial sensing, based on at least one of a channel busy rate (CBR) or channel occupancy ratio (CR).

In certain aspects, the code 1428 for receiving may include code for receiving, from another UE, an indication of one or more recommended sets of resources; and/or receiving signaling, from the other UE, an indication of one of the recommended set of resources to use for sidelink communications.

In certain aspects, the code 1430 for generating may include code for generating, based on the partial sensing, one or more recommended sets of resources.

In certain aspects, the code 1432 for providing may include code for providing, to another UE, an indication of one or more recommended sets of resources.

In certain aspects, the processor 1404 has circuitry configured to implement the code stored in the computer-readable medium/memory 1412. The processor 1404 includes circuitry 1434 for performing; circuitry 1436 for selecting; circuitry 1438 for deciding; circuitry 1440 for receiving; circuitry 1442 for generating; and circuitry 1444 for providing.

In certain aspects, the circuitry 1434 for performing may include circuitry for performing partial sensing by monitoring for sidelink transmissions from one or more other UEs using one or more different beams during one or more different portions of a sensing window; circuitry for performing full sensing by monitoring for sidelink transmissions from one or more other UEs during a larger portion of the sensing window than used for the partial sensing, when the UE changes to a new beam for sidelink communications or makes a new connection to another UE; and/or circuitry for performing the partial sensing based on the one or more recommended sets of resources.

In certain aspects, the circuitry 1434 for selecting may include circuitry for selecting resources, within a resource selection window, for future sidelink communications based on results of the partial sensing and/or code for selecting, based on the partial sensing, one of the one or more recommended sets of resources to use for subsequent sidelink communication with the other UE.

In certain aspects, the circuitry 1436 for deciding may include circuitry for deciding whether to perform the partial sensing or full sensing by monitoring a larger portion of the sensing window than used for the partial sensing, based on at least one of a channel busy rate (CBR) or channel occupancy ratio (CR).

In certain aspects, the circuitry 1436 for receiving may include circuitry for receiving, from another UE, an indication of one or more recommended sets of resources; and/or receiving signaling, from the other UE, an indication of one of the recommended set of resources to use for sidelink communications.

In certain aspects, the circuitry 1438 for generating may include circuitry for generating, based on the partial sensing, one or more recommended sets of resources.

In certain aspects, the circuitry 1440 for providing may include circuitry for providing, to another UE, an indication of one or more recommended sets of resources.

Example Aspects

Aspect 1: A method for wireless communications by a user equipment (UE), comprising performing partial sensing by monitoring for sidelink transmissions from one or more other UEs using one or more different beams during one or more different portions of a sensing window; and selecting resources, within a resource selection window, for future sidelink communications based on results of the partial sensing.

Aspect 2: The method of Aspect 1, wherein the selecting is based on an indication, in sidelink transmissions sensed during the monitoring, of resources reserved for future sidelink communications by the one or more other UEs.

Aspect 3: The method of Aspect 2, wherein the sensed sidelink transmissions comprise at least one of: sidelink control information (SCI), transmission reservation announcement, reception reservation announcement, or physical sidelink feedback channel (PSFCH) transmissions.

Aspect 4: The method of any of Aspects 1-3, wherein the one or more different beams correspond to different UEs with which the UE communicates via a sidelink.

Aspect 5: The method of any of Aspects 1-4, wherein the monitoring is triggered via a resource selection trigger that occurs before or after the sensing window.

Aspect 6: The method of any of Aspects 1-5, further comprising performing full sensing by monitoring for sidelink transmissions from one or more other UEs during a larger portion of the sensing window than used for the partial sensing, when the UE changes to a new beam for sidelink communications or makes a new connection to another UE.

Aspect 7: The method of any of Aspects 1-6, wherein the one or more different portions of the sensing window that are monitored with the one or more different beams have one or more different durations.

Aspect 8: The method of Aspect 7, wherein a duration of monitoring with a beam is determined based on a corresponding beam width.

Aspect 9: The method of any of Aspects 1-8, further comprising deciding whether to perform the partial sensing or full sensing by monitoring a larger portion of the sensing window than used for the partial sensing, based on at least one of a channel busy rate (CBR) or channel occupancy ratio (CR).

Aspect 10: The method of any of Aspects 1-9, further comprising receiving, from another UE, an indication of one or more recommended sets of resources; performing the partial sensing based on the one or more recommended sets of resources; and selecting, based on the partial sensing, one of the one or more recommended sets of resources to use for subsequent sidelink communication with the other UE.

Aspect 11: The method of Aspect 10, further comprising signaling the other UE to use the selected recommended set of resources.

Aspect 12: The method of Aspect 10 or 11, wherein the partial sensing is performed using a beam used to communicate with the other UE.

Aspect 13: The method of any of Aspects 1-12, further comprising generating, based on the partial sensing, one or more recommended sets of resources; and providing, to another UE, an indication of one or more recommended sets of resources.

Aspect 14: The method of Aspect 13, further comprising receiving signaling, from the other UE, an indication of one of the recommended set of resources to use for sidelink communications.

Aspect 15: The method of Aspect 13 or 14, wherein the partial sensing is performed using a beam used to communicate with the other UE.

Aspect 16: An apparatus for wireless communication by a UE, comprising a memory and at least one processor coupled to the memory, the memory and the at least one processor being configured to perform any of the operations of Aspects 1-15.

Aspect 17: An apparatus for wireless communication by a UE, comprising means for performing any of the operations of Aspects 1-15.

Aspect 18: A computer readable medium having instructions stored thereon for performing any of the operations of Aspects 1-15.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
performing, by the first UE, partial sensing during a sensing window of the first UE by monitoring for sidelink transmissions from a plurality of UEs comprising a second UE and a third UE, wherein the monitoring comprises using different beams comprising at least a first beam for a first duration at a first time during the sensing window to monitor the sidelink transmissions from the second UE and a second beam for a second duration at a second time during the sensing window to monitor the sidelink transmissions from the third UE; and
selecting, by the first UE, resources, within a resource selection window, for future sidelink communications based on results of the partial sensing.

2. The method of claim 1, wherein the first UE monitors during the sensing window for the sidelink transmissions from the plurality of UEs to identify resources reserved for future sidelink transmissions.

3. The method of claim 1, wherein the selecting is based on an indication, in the sidelink transmissions sensed during the monitoring, of resources reserved for future sidelink communications by the plurality of UEs.

4. The method of claim 3, wherein the sensed sidelink transmissions comprise at least one of: sidelink control information (SCI), transmission reservation announcement, reception reservation announcement, or physical sidelink feedback channel (PSFCH) transmissions.

5. The method of claim 1, wherein the different beams correspond to the plurality of UEs with which the UE communicates via a sidelink.

6. The method of claim 1, wherein the monitoring is triggered via a resource selection trigger that occurs before or after the sensing window.

7. The method of claim 1, further comprising:
performing, by the first UE, full sensing to monitor the sidelink transmissions from the plurality of UEs during a larger portion of the sensing window than used for the partial sensing, when the first UE changes to a new beam for sidelink communications or makes a new connection to another UE.

8. The method of claim 1, wherein a duration of monitoring with a beam is determined based on a corresponding beam width.

9. The method of claim 1, further comprising deciding whether to perform the partial sensing or full sensing by monitoring a larger portion of the sensing window than used for the partial sensing, based on at least one of a channel busy rate (CBR) or channel occupancy ratio (CR).

10. The method of claim 1, further comprising:
receiving, by the first UE, from another UE, an indication of one or more recommended sets of resources;
performing, by the first UE, the partial sensing based on the one or more recommended sets of resources;
selecting, by the first UE, based on the partial sensing, one of the one or more recommended sets of resources to use for subsequent sidelink communication with the other UE; and
signaling, by the first UE, the other UE to use the selected recommended set of resources.

11. The method of claim 10, wherein the partial sensing is performed using a beam used to communicate with the other UE.

12. The method of claim 1, further comprising:
generating, by the first UE, based on the partial sensing, one or more recommended sets of resources; and
providing, by the first UE, to another UE, an indication of one or more recommended sets of resources.

13. The method of claim 12, further comprising receiving, by the first UE, signaling, from the other UE, with an indication of one of the recommended set of resources to use for sidelink communications.

14. The method of claim 12, wherein the partial sensing is performed using a beam used to communicate with the other UE.

15. An apparatus for wireless communication by a first user equipment (UE) comprising:
a memory comprising instructions; and one or more processors, individually or collectively, configured to execute the instructions and cause the apparatus to:
  perform partial sensing during a sensing window of the first UE by monitoring for sidelink transmissions from a plurality of UEs comprising a second UE and a third UE, wherein the monitoring comprises using different beams comprising at least a first beam for a first duration at a first time during the sensing window to monitor the sidelink transmissions from the second UE and a second beam for a second duration at a second time during the sensing window to monitor the sidelink transmissions from; and
  select resources, within a resource selection window, for future sidelink communications based on results of the partial sensing.

16. The apparatus of claim 15, wherein the one or more processors, individually or collectively, are configured to execute the instructions and cause the apparatus to monitor during the sensing window for the sidelink transmissions from the plurality of UEs to identify resources reserved for future sidelink transmissions.

17. The apparatus of claim 15, wherein the selection is based on an indication, in the sidelink transmissions sensed during the monitoring, of resources reserved for future sidelink communications by the plurality of UEs.

18. The apparatus of claim 17, wherein the sensed sidelink transmissions comprise at least one of: sidelink control information (SCI), transmission reservation announcement, reception reservation announcement, or physical sidelink feedback channel (PSFCH) transmissions.

19. The apparatus of claim 15, wherein the different beams correspond to the plurality of UEs with which the first UE communicates via a sidelink.

20. The apparatus of claim 15, wherein the monitoring is triggered via a resource selection trigger that occurs before or after the sensing window.

21. The apparatus of claim 15, wherein the one or more processors, individually or collectively, are configured to execute the instructions and cause the apparatus to:
  perform full sensing by monitoring for the sidelink transmissions from the plurality of UEs during a larger portion of the sensing window than used for the partial sensing, when the first UE changes to a new beam for sidelink communications or makes a new connection to another UE.

22. The apparatus of claim 15, wherein a duration of monitoring with a beam is determined based on a corresponding beam width.

23. The apparatus of claim 15, wherein the one or more processors, individually or collectively, are configured to execute the instructions and cause the apparatus to decide whether to perform the partial sensing or full sensing by monitoring a larger portion of the sensing window than used for the partial sensing, based on at least one of a channel busy rate (CBR) or channel occupancy ratio (CR).

24. The apparatus of claim 15, wherein the one or more processors, individually or collectively, are configured to execute the instructions and cause the apparatus to:
  receive, from another UE, an indication of one or more recommended sets of resources;
  perform the partial sensing based on the one or more recommended sets of resources;
  select, based on the partial sensing, one of the one or more recommended sets of resources to use for subsequent sidelink communication with the other UE; and
  signal the other UE to use the selected recommended set of resources.

25. The apparatus of claim 24, wherein the partial sensing is performed using a beam used to communicate with the other UE.

26. The apparatus of claim 15, wherein the one or more processors, individually or collectively, are configured to execute the instructions and cause the apparatus to:
  generate, based on the partial sensing, one or more recommended sets of resources; and
  provide, to another UE, an indication of one or more recommended sets of resources.

27. An apparatus for wireless communications by a first user equipment (UE), comprising:
  means for performing partial sensing during a sensing window of the first UE by monitoring for sidelink transmissions from a plurality of UEs comprising a second UE and a third UE, wherein the monitoring comprises using different beams comprising at least a first beam for a first duration at a first time during the sensing window to monitor the sidelink transmissions from the second UE and a second beam for a second duration at a second time during the sensing window to monitor the sidelink transmissions from the third UE; and
  means for selecting resources, within a resource selection window, for future sidelink communications based on results of the partial sensing.

28. A non-transitory computer readable medium having instructions stored thereon, that when executed by one or more processors, individually or collectively, of a first user equipment (UE), perform a method comprising:
  performing partial sensing during a sensing window of the first UE by monitoring for sidelink transmissions from a plurality of UEs comprising a second UE and a third UE, wherein the monitoring comprises using different beams comprising at least a first beam for a first duration at a first time during the sensing window to monitor the sidelink transmissions from the second UE and a second beam for a second duration at a second time during the sensing window to monitor the sidelink transmissions the third UE; and
  selecting resources, within a resource selection window, for future sidelink communications based on results of the partial sensing.

* * * * *